United States Patent
Patmont

[19]

[11] Patent Number: 6,095,274
[45] Date of Patent: Aug. 1, 2000

[54] ENGINE DRIVE FOR SCOOTER

[76] Inventor: Steven J. Patmont, 8525 Lupine Ct., Pleasanton, Calif. 94588

[21] Appl. No.: 09/058,407

[22] Filed: Apr. 9, 1998

[51] Int. Cl.$^7$ .................................................. B62D 61/02
[52] U.S. Cl. ........................... 180/181; 180/221; 180/298
[58] Field of Search ..................... 180/180, 181, 180/205, 206, 342, 298, 221, 228, 227; 280/288

[56] References Cited

U.S. PATENT DOCUMENTS

| | | | |
|---|---|---|---|
| D. 364,845 | 12/1995 | Witthaus | D12/218 |
| 1,707,831 | 4/1929 | Wayerski | 280/87.041 |
| 2,546,711 | 3/1951 | Amendt | 280/87.041 |
| 2,578,886 | 12/1951 | Isherwood et al. | 180/221 |
| 2,586,082 | 2/1952 | Piatti | 180/221 |
| 3,140,100 | 7/1964 | Nichols | 280/87.041 |
| 3,961,678 | 6/1976 | Hirano et al. | 180/220 |
| 4,081,048 | 3/1978 | Hendricks | 180/205 |
| 4,170,369 | 10/1979 | Strutman | 280/261 |
| 4,386,675 | 6/1983 | Landon | 180/221 |
| 4,526,249 | 7/1985 | Parker | 180/219 |
| 4,727,951 | 3/1988 | Morioka et al. | 180/219 |
| 4,821,832 | 4/1989 | Patmont | 180/208 |
| 5,054,572 | 10/1991 | Parker | 180/224 |
| 5,361,864 | 11/1994 | Tanaka | 180/219 |
| 5,388,659 | 2/1995 | Pepe | 180/277 |
| 5,413,368 | 5/1995 | Pong et al. | 280/277 |
| 5,491,390 | 2/1996 | McGreen | 318/5 |
| 5,494,128 | 2/1996 | Witthaus | 180/221 |
| 5,660,242 | 8/1997 | Witthaus | 180/19.1 |
| 5,775,452 | 7/1998 | Patmont | 180/181 |

*Primary Examiner*—J. J. Swann
*Assistant Examiner*—David R. Dunn
*Attorney, Agent, or Firm*—Shapiro Buchman Provine & Patton LLP; Mitchell S. Rosenfeld

[57] ABSTRACT

An "all terrain" scooter is provided with a large central tubular chassis having two central brackets supporting a platform. At the rear, the tubular frame is offset to one side of the chassis for cantilevered support of the rear driven wheel. From this portion of the frame, an engine is pivotally mounted on a pivot arm at a pivot point offset from the axis of rotation of the driven wheel. This engine has a protruding driving shaft overlying the driven wheel for moving into and out of contact with the ground contact surface of the driven wheel. The pivot point of the pivot arm is offset relative to a line between the point of contact of the protruding driving shaft and the center of driven wheel rotation. This offset is in the direction of driven wheel rotation at the point of contact of the protruding driving shaft and causes increased driving contact with required increased scooter driving force. A derailleur cable rachet and cable connection acts against both a spring biasing the protruding driving shaft into the driven wheel and the vector force. This derailleur cable rachet and cable precisely controls and limits engine and protruding driving shaft pivotal contact with the driven wheel. As a consequence of this precisely limited pivotal action, precise driving control between the driven shaft and protruding wheel occurs to enable corresponding precise control over scooter propulsion.

3 Claims, 5 Drawing Sheets

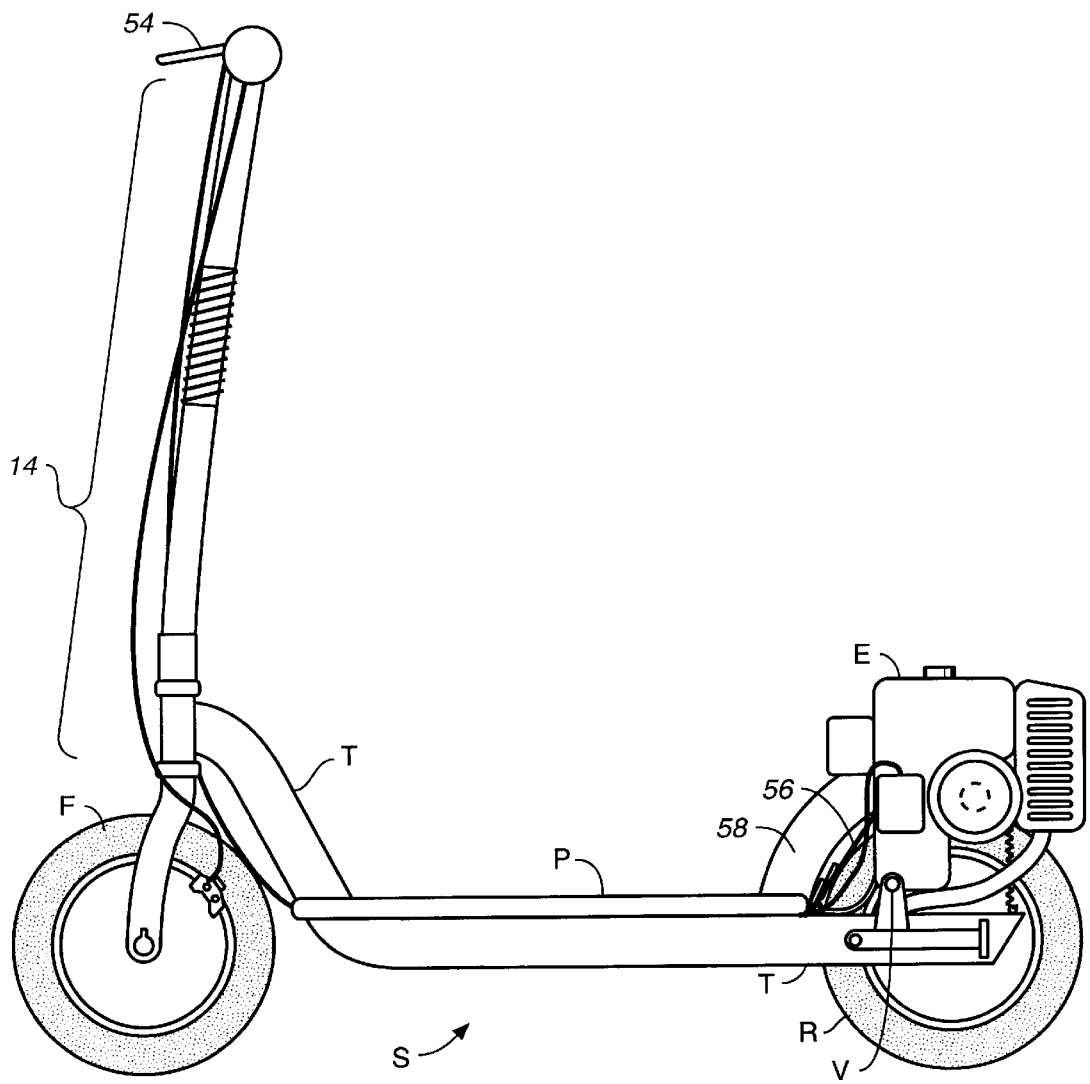
FIG._1

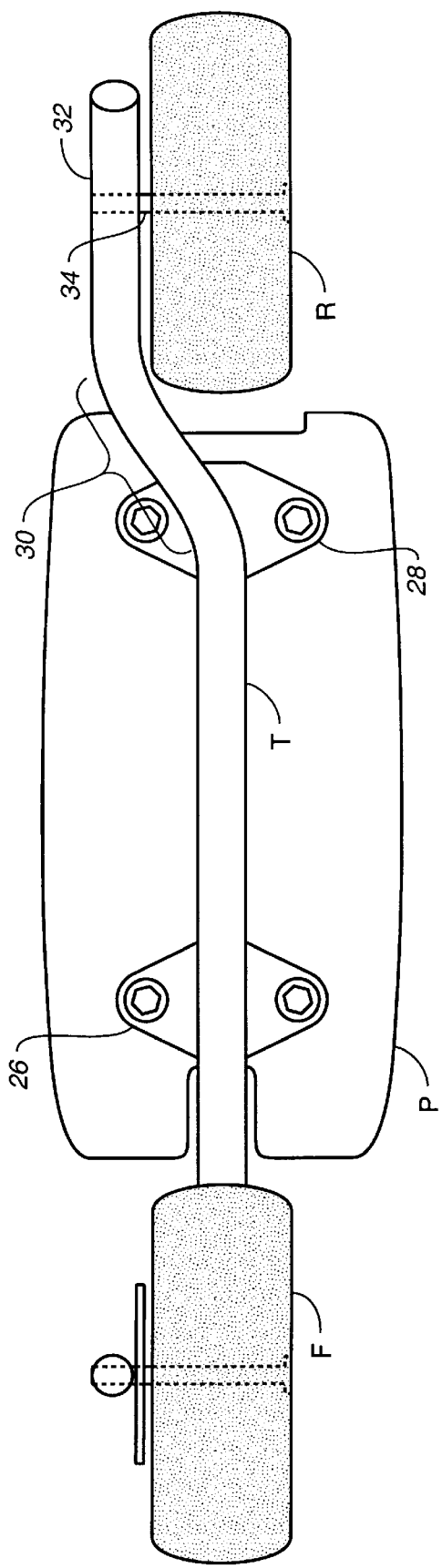
FIG._2

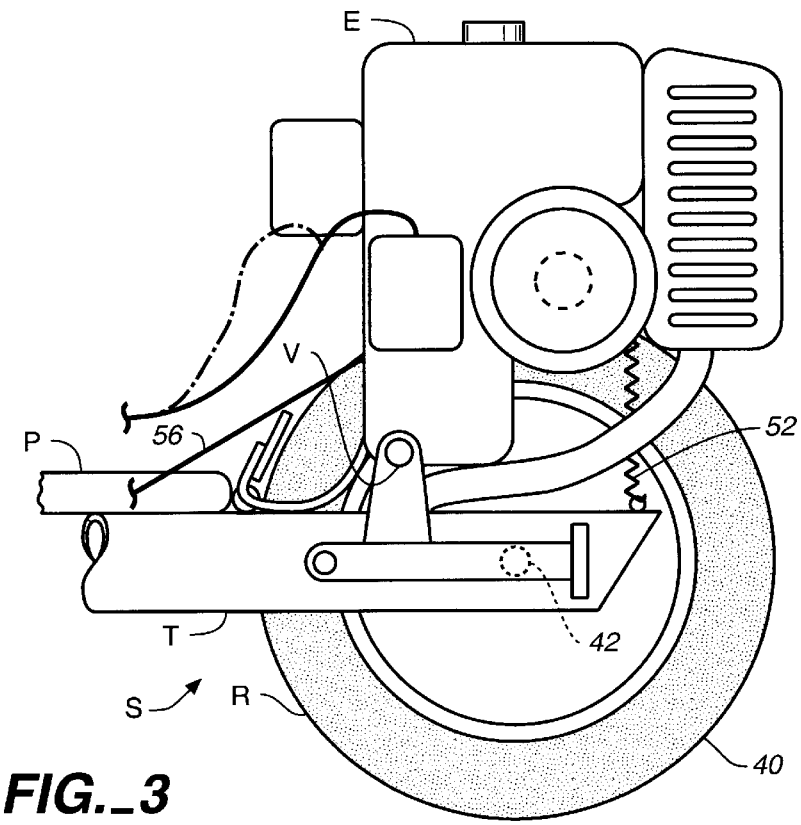
FIG._3
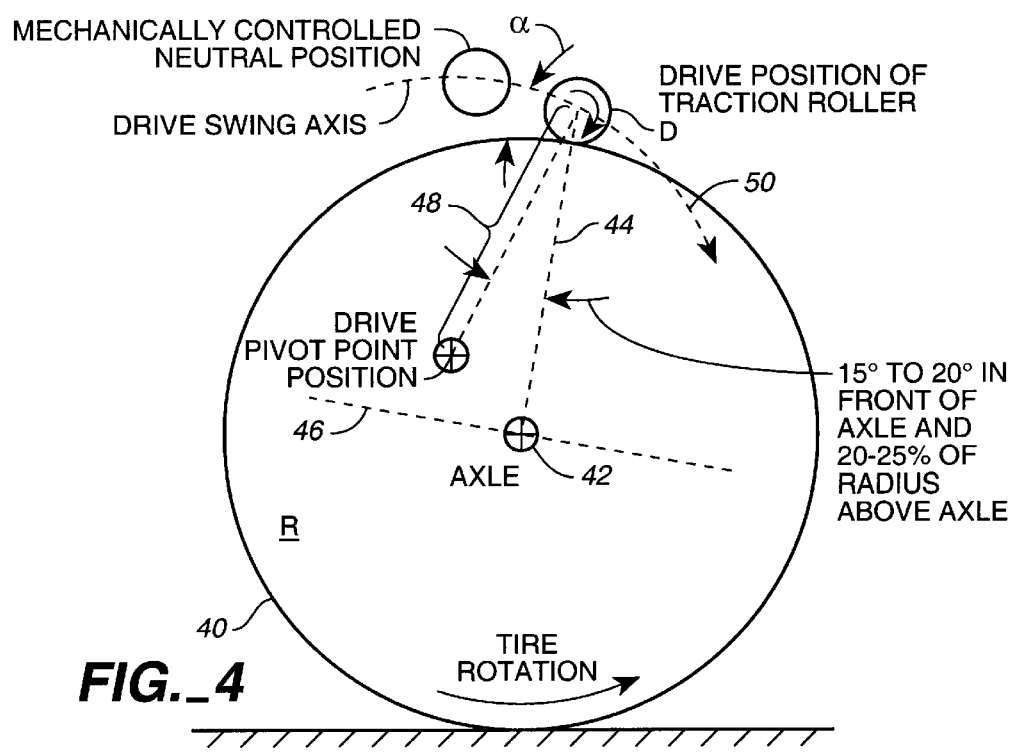
FIG._4

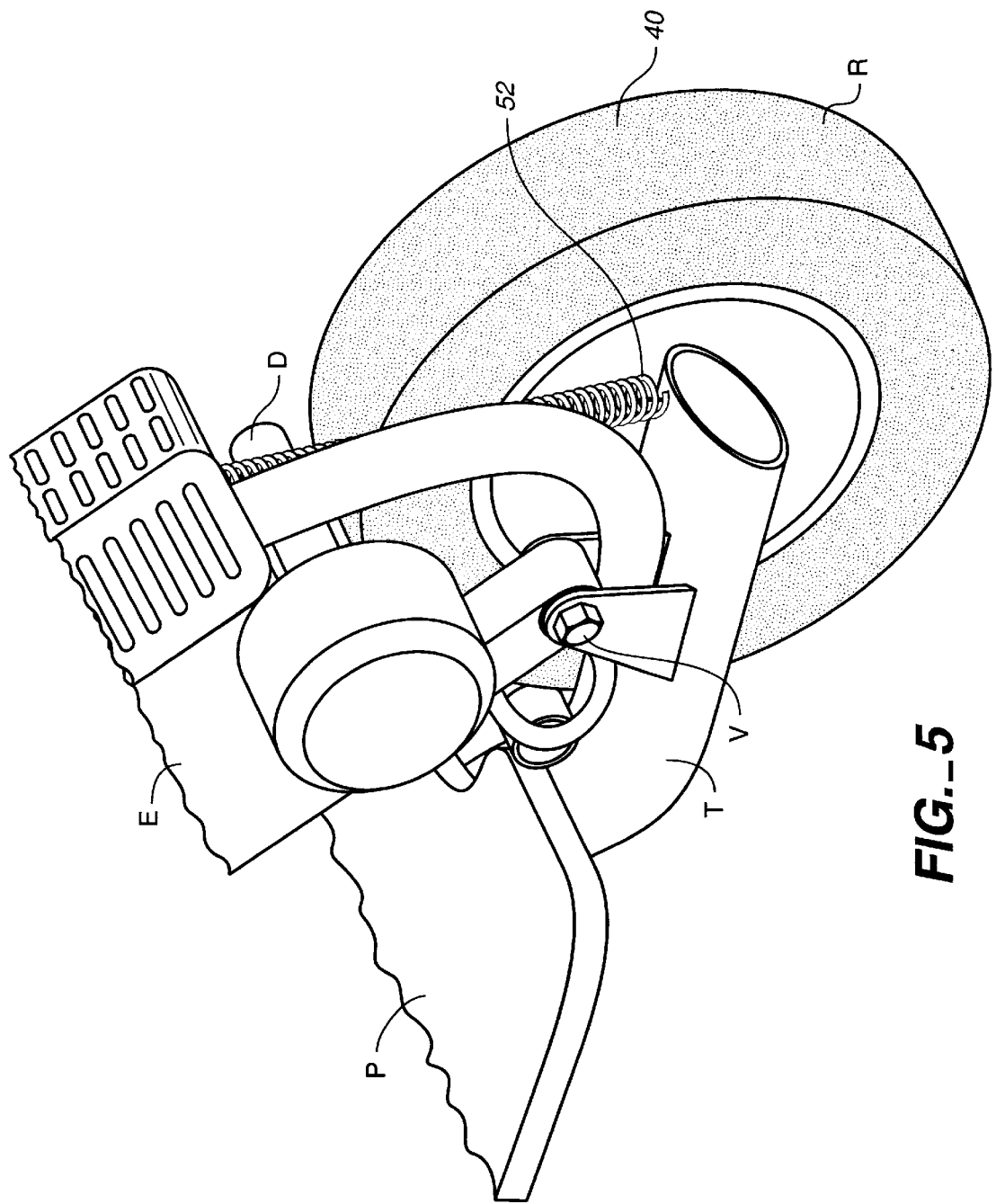
FIG._5

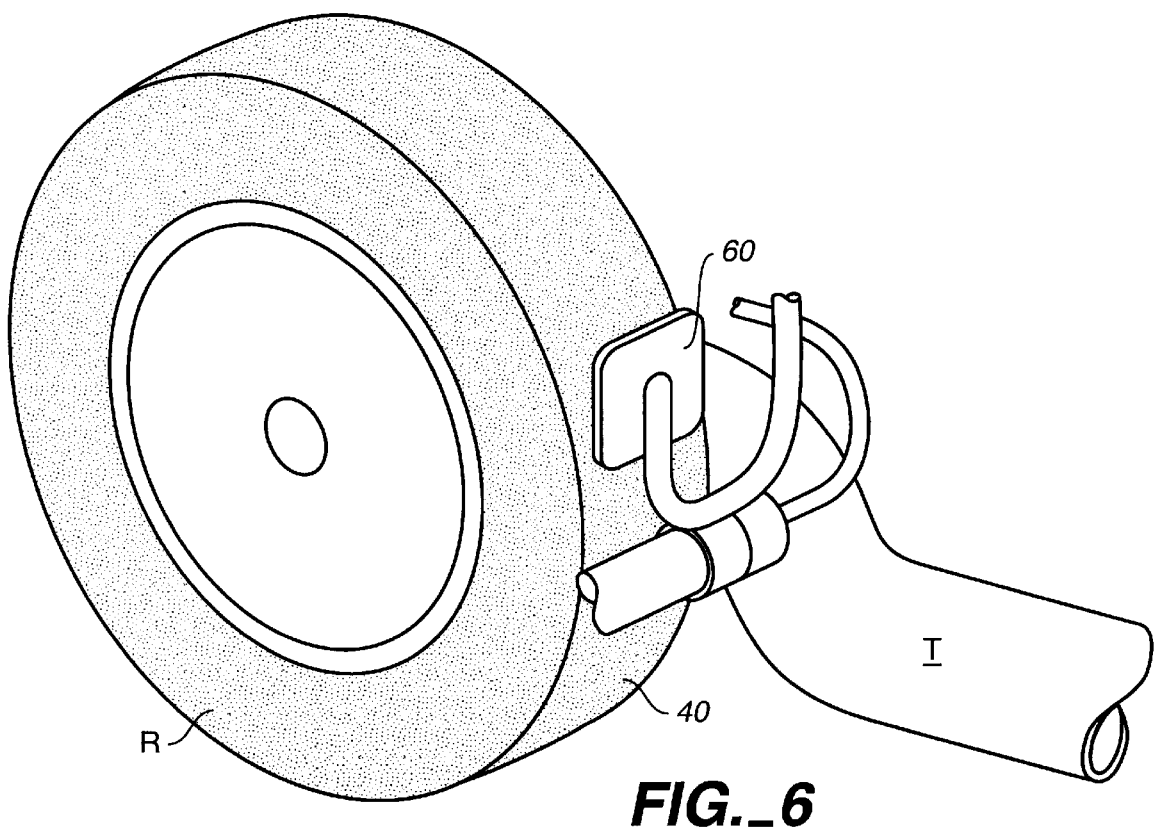
FIG._6 and directs the scooter. More particularly, a two wheel scooter a simplified drive for the rear driven wheel where the drive is self engaging to the wheel with precision control of the drive occur through a cable control lever such as a bicycle derailleur cable control rachet.

ENGINE DRIVE FOR SCOOTER

This invention relates to motor driven scooters in which the rider of the scooter stands upon a scooter platform and directs the scooter. More particularly, a two wheel scooter a simplified drive for the rear driven wheel where the drive is self engaging to the wheel with precision control of the drive occur through a cable control lever such as a bicycle derailleur cable control rachet.

BACKGROUND OF THE INVENTION

Engine drives for scooters are known. Such drives have included direct shaft drives from small engines as well as fluid drives.

In the drive of such scooters, precision control of the forward speed of the scooter is required. At the same time, because of the extreme light weight and rugged treatment which such scooter drives must endure, simplicity of drive design is required.

SUMMARY OF THE INVENTION

An "all terrain" scooter is provided with a large central tubular chassis having two central brackets supporting a platform. At the rear, the tubular frame is offset to one side of the chassis for cantilevered support of the rear driven wheel. From this portion of the frame, an engine is pivotally mounted on a pivot arm at a pivot point offset from the axis of rotation of the driven wheel. This engine has a protruding driving shaft overlying the driven wheel for moving into and out of contact with the ground contact surface of the driven wheel. The pivot point of the pivot arm is offset relative to a line between the point of contact of the protruding driving shaft and the center of driven wheel rotation. This offset is in the direction of driven wheel rotation at the point of contact of the protruding driving shaft and causes increased driving contact with required increased scooter driving force. A cable control lever such as a derailleur cable rachet and cable connection acts against both a spring biasing the protruding driving shaft into the driven wheel and the vector force. This cable control lever and cable precisely controls and limits engine and protruding driving shaft pivotal contact with the driven wheel. As a consequence of this precisely limited pivotal action, precise driving control between the driven shaft and protruding wheel occurs to enable corresponding precise control over scooter propulsion.

BRIEF DESCRIPTION OF THE DRAWINGS

FIG. 1 is a side elevation of a scooter having the drive of this invention emphasizing the location of the cable control lever, and the path of the cable to the engine;

FIG. 2 is a bottom plan view of the scooter emphasizing the cantilevered support of the driven wheel and the pivotal support of the engine above the offset portion of the main tubular member in the vicinity of the engine;

FIG. 3 is a side elevation of the offset portion of the main tubular member illustrating the pivot point of engine attachment, a biasing spring pulling the engine into contact with the driven wheel, and the cable control lever tensioned cable urging the wheel out of contact with the driven wheel;

FIG. 4 is a diagram of the pivot path of the protruding driving shaft and the surface of the driven wheel of FIG. 3 illustrating how the vector reactive force between the driving protruding shaft and the driven wheel urges contact;

FIG. 5 illustrates the engine of FIG. 3 pulled out of contact with the driven wheel; and, FIG. 6 illustrates the hinged fender, and underlying brake supplemental to the driving system here disclosed.

DESCRIPTION OF THE PREFERRED EMBODIMENT

Referring to FIGS. 1 and 2, scooter S can be understood. Scooter S includes standing platform P, front steered wheel F and rear driven wheel R. Engine E drives rear driven wheel R in the apparatus disclosed herein.

Scooter S includes steering handle 14 which rotates on head tube H. The single structural member of the scooter chassis is main structural tube T. Main structural tube T connects to head tube H at the front, supports standing platform P in the middle via coupling 26 and 28 and terminates at rear tire mounting section 32. Referring specifically to FIG. 2, it will be seen that main structural tube T has side displacing section 30 followed by rear tire mounting section 32. Rear tire mounting section 32 supports rear driven wheel R via axle 34.

Having generally set forth the construction of scooter S, attention will be given first to the physical mounting of engine E to main structural tube T and second to the mechanics of the driving of rear driven wheel R.

Referring to FIGS. 3 and 5, engine E is mounted on pivot V. As can be seen in FIG. 5, engine E has protruding driving shaft D which here rotates at the same speed as engine E. Protruding driving shaft D directly contacts ground contact surface 40 of rear driven wheel R. It will be understood that when protruding driving shaft D is in contact with ground contact surface 40 and engine E is operating, scooter S will be driven.

Having said this much, attention will now be devoted to the drive schematic of FIG. 4. Rear driven wheel R turns on axle 42. In order to understand the physics of this invention, it will be seen that radial 44 has been drawn from protruding driving shaft D and its contact point on ground contact surface 40 of rear driven wheel R.

Pivot V is offset with respect to this radial 44.

Specifically, and taking the point where protruding driving shaft D contacts ground contact surface 40, pivot V is offset from radial 44 in the direction that ground contact surface 40 moves away from protruding driving shaft D. Pivot V is above axle 42 with respect to normal 46 taken through radial 44.

Specifically, I have found that pivot V should have and angle of 10° to 40° relative to the point of contact between protruding driving shaft D and ground contact surface 40. This range can be narrowed to be between 15° and 30° and more optimally is 20°.

Further, I prefer that the length of pivot arm 48 be less than the length of radial 44 by a ratio of about 60% to 90% in a broad range, 70% to 80% in a medium range, and about 75% as shown in the preferred embodiment.

It will further be noticed that protruding driving shaft D swings in an arc 50. Arc 50 will be seen to intersect ground contact surface 40 of rear driven wheel R at an acute angle α.

Having set forth this construction, the interaction of protruding driving shaft D and rear driven wheel R during vehicle operation can now be set forth.

Specifically, and as illustrated in FIG. 4, rear driven wheel R turns counterclockwise. Protruding driving shaft D turns clockwise. Taking the reactive force from protruding driving shaft D, it will be understood that engine E on pivot arm 48 drives protruding shaft D counterclockwise and into contact with ground contact surface 40 of rear driven wheel R.

Given the position of pivot V, it will be understood that protruding driving shaft D moves along arc 50. This arc 50 contacts ground contact surface 40 of the driven wheel as a shallow (acute) angle. As a result of this motion, firm driving contact takes place—even in the absence of any other biasing forces present.

In the preferred embodiment, two biasing forces are present. One is the weight of engine E. The remaining force is supplied by tension from coil spring 52, which extends from the distal end of main structural tube T to engine E.

Referring to FIGS. 1 and 3, it will be understood that the motion of engine E and protruding driving shaft D into rear driven wheel R at ground contact surface 40 must be controlled. Precise control of this motion gives corresponding precise control of the motion of scooter S. This being the case, cable control lever such as derailleur cable rachet 54 acting on cable 56 limits such contact. By the simple expedient of tensioning cable 56 through cable control lever 54, precision control of the scooter driving force occurs.

It should be understood that the drive here disclosed does not appreciably effect either the placement of fender 58 which hinges to the chassis. Likewise, a conventional scooter brake 60 can be utilized.

In this use of this scooter S, it will be understood that where it is used off road, it is possible to completely disengage engine E from rear driven wheel R. In this case, pushing or coasting of scooter S can occur in an conventional manner.

What is claimed is:

1. A scooter comprising in combination:
    a central tubular chassis having a front portion and rear portion;
    a platform supported on the central tubular chassis between the front portion and the rear portion;
    a front steered wheel with a peripheral ground contacting surface attached to the tubular chassis at the front portion;
    a rear driven wheel with a peripheral ground contacting surface attached to the tubular chassis at the rear portion;
    a cantilevered support permitting rotation of the rear driven wheel;
    an engine pivotally mounted to the tubular chassis on a pivot arm, the pivot arm attached to the tubular chassis at a pivot point offset from the axis of rotation of the driven wheel;
    a protruding driving shaft driven by the engine overlying the driven wheel for moving into and out of contact with the ground contact surface of the driven wheel;
    the pivot point of the pivot arm offset relative to a line between the point of contact of the protruding driving shaft and the center of driven wheel rotation in the direction of driven wheel rotation at the protruding driving shaft whereby the reactive vector component acting on the driving protruding shaft urges the driving protruding shaft into contact with the ground contact surface of the driven wheel;
    a cable control lever; and
    a cable connected to the cable control lever at one end and attached to the engine at a position spaced apart from the pivot at the opposite end to adjustably limit pivotal movement of the engine on the pivot arm whereby controlling movement of the protruding driving shaft into and out of contact with the ground contact surface of the driven wheel.

2. A scooter according to claim 1 and comprising in further combination:
    a spring biasing the engine in opposition to the cable and cable control lever whereby the cable control lever and cable precisely controls protruding driving shaft pivotal contact with the driven wheel.

3. A scooter comprising in combination:
    a central chassis having a front end and rear end, the rear end being offset substantially horizontally from the central chassis;
    a platform supported between the front end and the rear end of the central chassis;
    a front steered wheel attached to the front end of the central chassis;
    a rear driven wheel attached to the rear end of the central chassis;
    a cantilevered support coupled between the rear end of the central chassis and the rear driven wheel permitting rotation of the rear driven wheel;
    an engine pivotally mounted to the tubular chassis by way of a pivot arm, the pivot arm attached to the central chassis at a pivot point offset from the axis of rotation of the driven wheel;
    a driving shaft driven by the engine for moving into contact with the driven wheel;
    a cable control lever; and
    a cable connected to the cable control lever at one end and attached to the engine at a position spaced apart from the pivot at the opposite end to adjustably limit pivotal movement of the engine on the pivot arm whereby controlling movement of the driving shaft into contact with the driven wheel.

* * * * *